(12) United States Patent
Koyama et al.

(10) Patent No.: US 8,307,730 B2
(45) Date of Patent: Nov. 13, 2012

(54) TRANSMISSION DEVICE

(75) Inventors: Shinya Koyama, Saitama (JP); Hitoshi Tokotani, Saitama (JP); Hiroaki Egashira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1073 days.

(21) Appl. No.: 11/642,679

(22) Filed: Dec. 21, 2006

(65) Prior Publication Data

US 2007/0144292 A1    Jun. 28, 2007

(30) Foreign Application Priority Data

Dec. 27, 2005    (JP) .................. 2005-376521

(51) Int. Cl.
*F16H 59/00*    (2006.01)
*F16H 61/00*    (2006.01)
*F16H 63/00*    (2006.01)

(52) U.S. Cl. ............. 74/335; 74/473.36; 74/6; 74/606 R (58) Field of Classification Search .............. 74/335, 74/337.5, 473.16, 473.36, 606 A, 606 R
See application file for complete search history.

(56) References Cited

U.S. PATENT DOCUMENTS

| 5,570,605 | A   | * | 11/1996 | Kitagawara et al. | ......... | 74/15.63 |
| 6,453,762 | B1  | * | 9/2002  | Nishikawa et al. | ............. | 74/335 |
| 6,484,597 | B2  | * | 11/2002 | Ota et al. | ........................ | 74/335 |
| 6,516,686 | B1  | * | 2/2003  | Hori et al. | ..................... | 74/730.1 |
| 2005/0194230 | A1 | * | 9/2005 | Tsukada | ..................... | 192/70.27 |

FOREIGN PATENT DOCUMENTS

| GB | 2295208 A | * | 5/1996 |
| JP | 2001-108093 A | | 4/2001 |

* cited by examiner

*Primary Examiner* — Troy Chambers
*Assistant Examiner* — Gregory Prather
(74) *Attorney, Agent, or Firm* — Birch, Stewart, Kolasch & Birch, LLP (57) ABSTRACT

To provide a transmission device in which assembly of a shift spindle is improved. In the transmission device, a groove is formed on a shift spindle into an annular shape along the peripheral portion of the shift spindle. A positioning pin is mounted so as to be inserted through a through hole of a rear cover from the outside. The distal end of the positioning pin projecting inwardly of the rear cover is locked with the groove. A rib with which a spindle plate can come into abutment is formed on the inner side of the rear cover. The groove is arranged on the extension of the through hole in a state in which the spindle plate comes into abutment with the rib.

22 Claims, 6 Drawing Sheets

TRANSMISSION DEVICE

CROSS-REFERENCE TO RELATED APPLICATIONS

This nonprovisional application claims priority under 35 U.S.C. §119(a) on Patent Application No. 2005-376521, filed in Japan on Dec. 27, 2005, the entirety of which is incorporated herein by reference.

FIELD OF THE INVENTION

The present invention relates mainly to a transmission device used for an internal combustion engine or the like.

DESCRIPTION OF BACKGROUND ART

A saddle-type vehicle such as a motorcycle or a buggy is generally provided with a power unit integrally including an engine (internal combustion engine) and a transmission device. Gear shifting is achieved by operating a change pedal provided on the side portion of the transmission device with an operator's foot. A shift spindle, which is operated to rotate by the change pedal, is formed with a groove with which a positioning pin mounted to a cover of the power unit engages for constraining displacement of the shift spindle in the direction other than the direction of rotation thereof (for example, see JP-A-2001-108093).

When assembling the shift spindle to the power unit, the positioning pin is inserted into a through hole on the cover from the outside of the power unit to be brought into engagement with the groove of the shift spindle positioned inside the power unit. This work, however, is difficult because the interior of the power unit cannot be viewed easily.

SUMMARY OF THE INVENTION

In view of such a problem, it is an object of the present invention to provide a transmission device in which the assembly of a shift spindle is improved.

In order to achieve the object described above, a transmission device according to an embodiment of the present invention includes a gear train which can achieve a plurality of transmission speed ranges, a shift fork for changing meshing of the gear train, a shift drum for driving the shift fork, a rotatable shift spindle for driving the shift drum, and a cover member for covering the gear train, the shift fork, the shift drum and the shift spindle (for example, a power unit case in an embodiment), wherein the shift spindle includes a spindle plate for transmitting a rotational drive force of the shift spindle to the shift fork and a groove formed into an annular shape along the peripheral portion of the shift spindle so as to be rotatably supported at one side of the cover member, a positioning pin to be inserted into a through hole formed on the cover member from the other side of the cover member so that the distal end portion thereof projecting to the one side of the cover member is locked with the groove is provided, and a rib which can be brought into abutment with the spindle plate is formed on the one side of the cover member and the groove is arranged on the extension of the through hole in a state in which the spindle plate comes into abutment with the rib.

In the above-described embodiment of the present invention, preferably, the shift spindle is configured to extend in the direction forming a substantially right angle with respect to the shift drum and includes a sub shift spindle disposed in substantially parallel with the shift drum on one side of the cover member and being rotatable for driving the shift drum using a rotational drive force of the shift spindle, the sub shift spindle is provided with a sub spindle plate which is engaged with the spindle plate at the distal end thereof so that the rotational drive force of the spindle plate is transmitted to the sub shift spindle via the spindle plate and the sub spindle plate, and a projecting strip is formed on the one side of the cover member integrally with the rib, the projecting strip extends on the one side of the cover member so as to project further than the rib so that the distal end of the projecting strip comes into abutment with the sub spindle plate.

According to an embodiment of the present invention, the rib with which the spindle plate can come into abutment is formed on the one side of the cover member, and the groove is arranged on the extension of the through hole in the state in which the spindle plate comes into abutment with the rib. Therefore, the distal end portion of the positioning pin can be locked easily with the groove of the shift spindle without confirming the side of the cover member on which the shift spindle is arranged at the time of assembling the shift spindle, whereby assembly of the shift spindle can be improved.

Since the projecting strip whose distal end comes into abutment with the sub spindle plate is formed on the same side of the cover member integrally with the rib, the strength of the projecting strip which receives a thrust force of the sub shift spindle can be increased with a simple configuration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
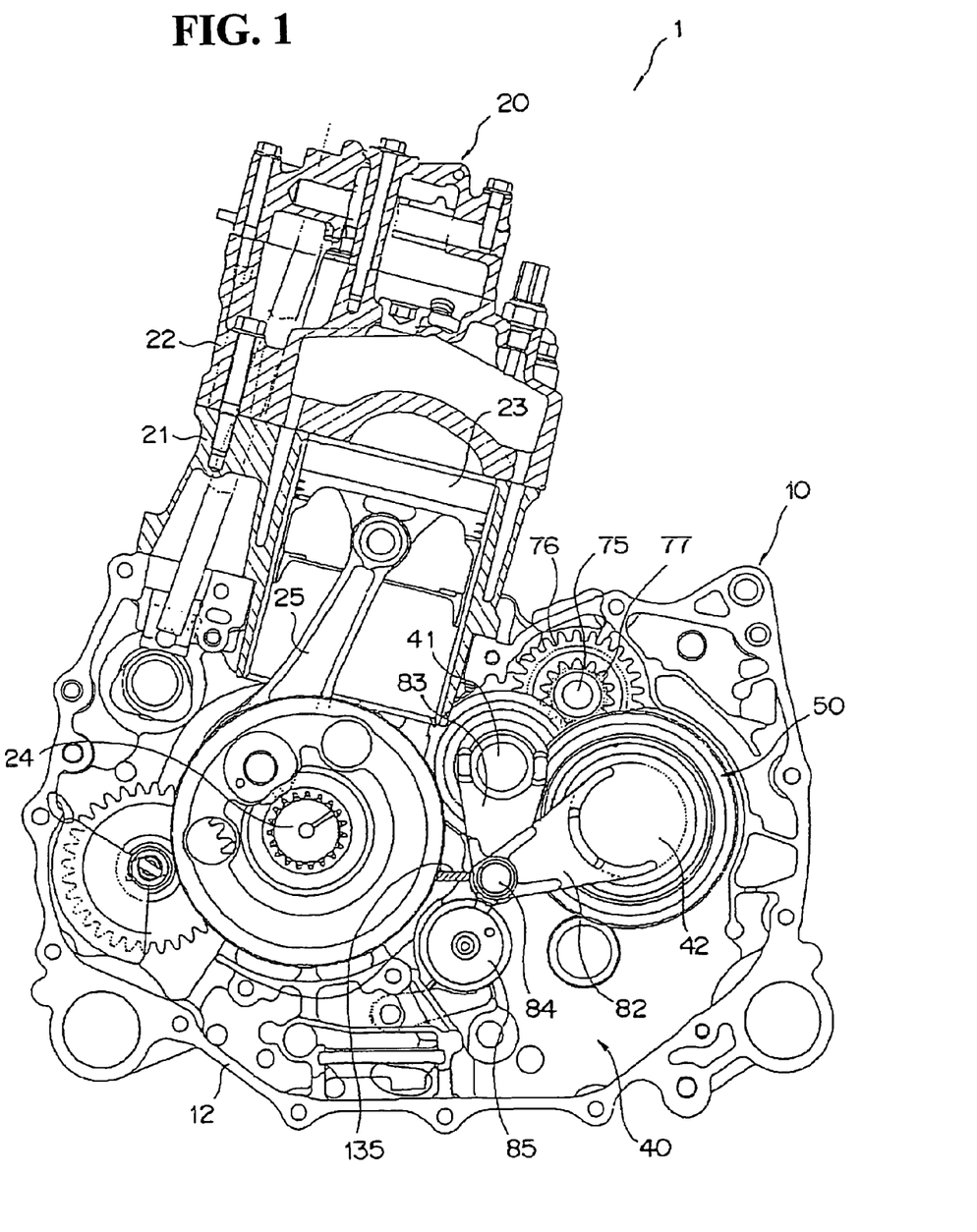
FIG. 1 is a front cross-sectional view of a vehicle power unit provided with a transmission device according to an embodiment of the present invention.
Figure 2:
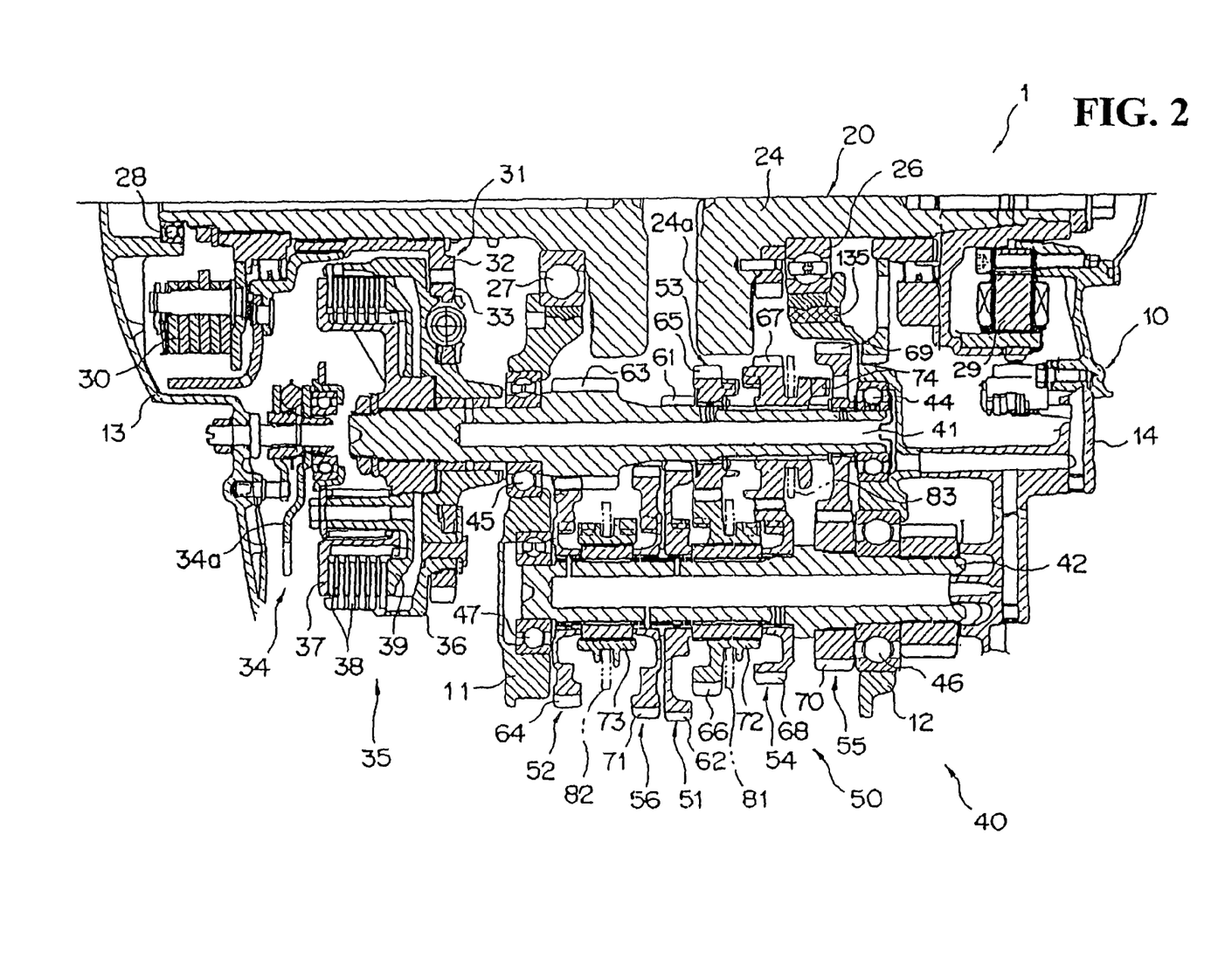
FIG. 2 is a side cross-sectional view showing a part of the power unit.

Referring to the drawings, a preferred embodiment of the present invention will be described below. FIG. 1 shows a vehicle power unit 1 provided with a transmission device according to the invention. The power unit 1 mainly includes an engine (internal combustion engine) 20, a transmission device 40 and a power unit case 10 for covering these members. The transmission device 40 is for shifting gears and transmitting the speed of a rotational drive force of a crankshaft 24 of the engine 20 obtained thereby to a drive wheel (not shown). As shown in FIG. 2, the power unit case 10 includes a front case 11, a rear case 12 joined to the rear surface of the front case 11, a front cover 13 joined to the front surface of the front case 11, and a rear cover 14 joined to the rear surface of the rear case 12. The left side in FIG. 2 corresponds to the front side of the power unit 1.

As shown in FIG. 1, a cylinder block 21 of the engine 20 is mounted to the upper portion of the power unit case 10. A cylinder head 22 is joined to an upper portion of the cylinder block 21. A piston 23 is slidably fitted to the interior of the cylinder block 21. The crankshaft 24 of the engine 20 is disposed in the interior of the power unit case 10 so as to extend in the fore-and-aft direction. The piston 23 is connected to the crankshaft 24 via a connecting rod 25 and a crankpin (not shown). As shown in FIG. 2, the crankshaft 24 is rotatably supported by the rear case 12, the front case 11 and the front cover 13 via ball bearings 26, 27, 28. An ACG (alternating current generator) 29 is disposed at the rear end portion of the crankshaft 24.

The transmission device 40 includes a main shaft 41 connected to the crankshaft 24 and a counter shaft 42 connected to a drive shaft (not shown). A gear train 50 for establishing a plurality of transmission speed ranges is provided between the main shaft 41 and the counter shaft 42. The main shaft 41 is disposed substantially in parallel with the crankshaft 24 in the interior of the power unit case 10, and is rotatably supported by the rear case 12 and the front case 11 via ball bearings 44, 45. The counter shaft 42 is disposed substantially in parallel with the crank shaft 24 and the main shaft 41 in the interior of the power unit case 10, and is rotatably supported by the rear case 12 and the front case 11 via ball bearings 46, 47.

The crankshaft 24 of the engine 20 and the main shaft 41 of the transmission device 40 are connected to each other via a starting clutch 30, a primary speed decreasing gear 31 and a clutch device 35. The rotational drive force of the crankshaft 24 is transmitted to the main shaft 41 via the starting clutch 30, the primary speed decreasing gear 31 and the clutch device 35. The rotational drive force (from the crankshaft 24) transmitted to the main shaft 41 is changed in speed by the gear train 50 at a predetermined transmission gear ratio and is transmitted from the counter shaft 42 to the drive shaft (not shown).

The centrifugal starting clutch 30 is disposed at a front end portion of the crankshaft 24, and is in an engaging state (a state in which the clutch is connected) by the rotation of the crankshaft 24, so that the rotational drive force of the crankshaft 24 is transmitted to a primary drive gear 32 disposed on the crankshaft 24.

The clutch device 35 is provided with a bottomed cylindrical clutch outer 36, which is rotatably supported by the main shaft 41 of the transmission device 40. A primary driven gear 33, which meshes with the primary drive gear 32, is mounted to the outside of the bottom portion of the clutch outer 36. The above-described primary speed decreasing gear 31 is configured with the primary drive gear 32 being relatively small in diameter and the primary driven gear 33 having a larger diameter than the primary drive gear 32. The multi-disk clutch device 35 includes a clutch inner 37 secured to the main shaft 41, a number of frictional disks 38 disposed between the clutch outer 36 and the clutch inner 37 and a pressurizing plate 39 for pressing the frictional disks 38. Engagement and disengagement of the clutch device 35 are achieved by a clutch releasing mechanism 34.

The gear train 50 for establishing the plurality of transmission speed ranges includes first to fifth speed gear trains 51 to 55 and a reverse gear train 56. The first gear train 51 includes a first drive gear 61 formed integrally with the main shaft 41 and a first driven gear 62 supported by the counter shaft 42 so as to be capable of relative rotation and meshed with the first drive gear 61. The second gear train 52 includes a second drive gear 63 formed integrally with the main shaft 41 and a second driven gear 64 supported by the counter shaft 42 so as to be capable of relative rotation and meshed with the second drive gear 63. The third gear train 53 includes a third drive gear 65 supported by the main shaft 41 so as to be capable of relative rotation and a third driven gear 66 spline-fitted to the counter shaft 42 and meshed with the third drive gear 65.

The fourth gear train 54 includes a fourth drive gear 67 spline-fitted to the main shaft 41 and a fourth driven gear 68 supported by the counter shaft 42 so as to be capable of relative rotation and meshed with the fourth drive gear 67. The fifth gear train 55 includes a fifth drive gear 69 supported by the main shaft 41 so as to be capable of relative rotation and a fifth driven gear 70 fixed to the counter shaft 42 and meshed with the fifth drive gear 69. The reverse gear train 56 includes the second drive gear 63 described above, a first intermediate gear 76 (see FIG. 1) fixed to an intermediate shaft 75 (see FIG. 1) disposed substantially in parallel with the crankshaft 24 and meshed with the second drive gear 63, a second intermediate gear 77 (see FIG. 1) formed integrally with the first intermediate gear 76 and a reverse driven gear 71 supported by the counter shaft 42 so as to be capable of relative rotation and meshed with the second intermediate gear 77.

A first/fourth gear change dog clutch member 72 is spline-fitted to the counter shaft 42 positioned between the first driven gear 62 and the third driven gear 66 so as to be capable of sliding in the axial direction. When the first/fourth gear change dog clutch member 72 is engaged with the first driven gear 62, the first gear train 51 is established, and when the first/fourth gear change dog clutch member 72 is engaged with the fourth driven gear 68, the fourth gear train 54 is established. The first/fourth gear change dog clutch member 72 is integrally formed with the third driven gear 66.

A second/reverse gear change dog clutch member 73 is spline-fitted to the counter shaft 42 positioned between the second driven gear 64 and the reverse driven gear 71 so as to be capable of sliding in the axial direction. When the second/reverse gear change dog clutch member 73 is engaged with the second driven gar 64, the second gear train 52 is established, and when the second/reverse gear change dog clutch member 73 is engaged with the reverse driven gear 71, the reverse gear train 56 is established.

A third/fifth gear change dog clutch member 74 is spline-fitted to the main shaft 41 positioned between the third drive gear 65 and the fifth drive gear 69 so as to be capable of sliding in the axial direction. When the third/fifth gear change dog clutch member 74 is engaged with the third drive gear 65, the third gear train 53 is established, and when the third/fifth gear change dog clutch member 74 is engaged with the fifth drive gear 69, the fifth gear train 55 is established. The third/fifth gear change dog clutch member 74 is integrally formed with the fourth drive gear 67.

Figure 3:
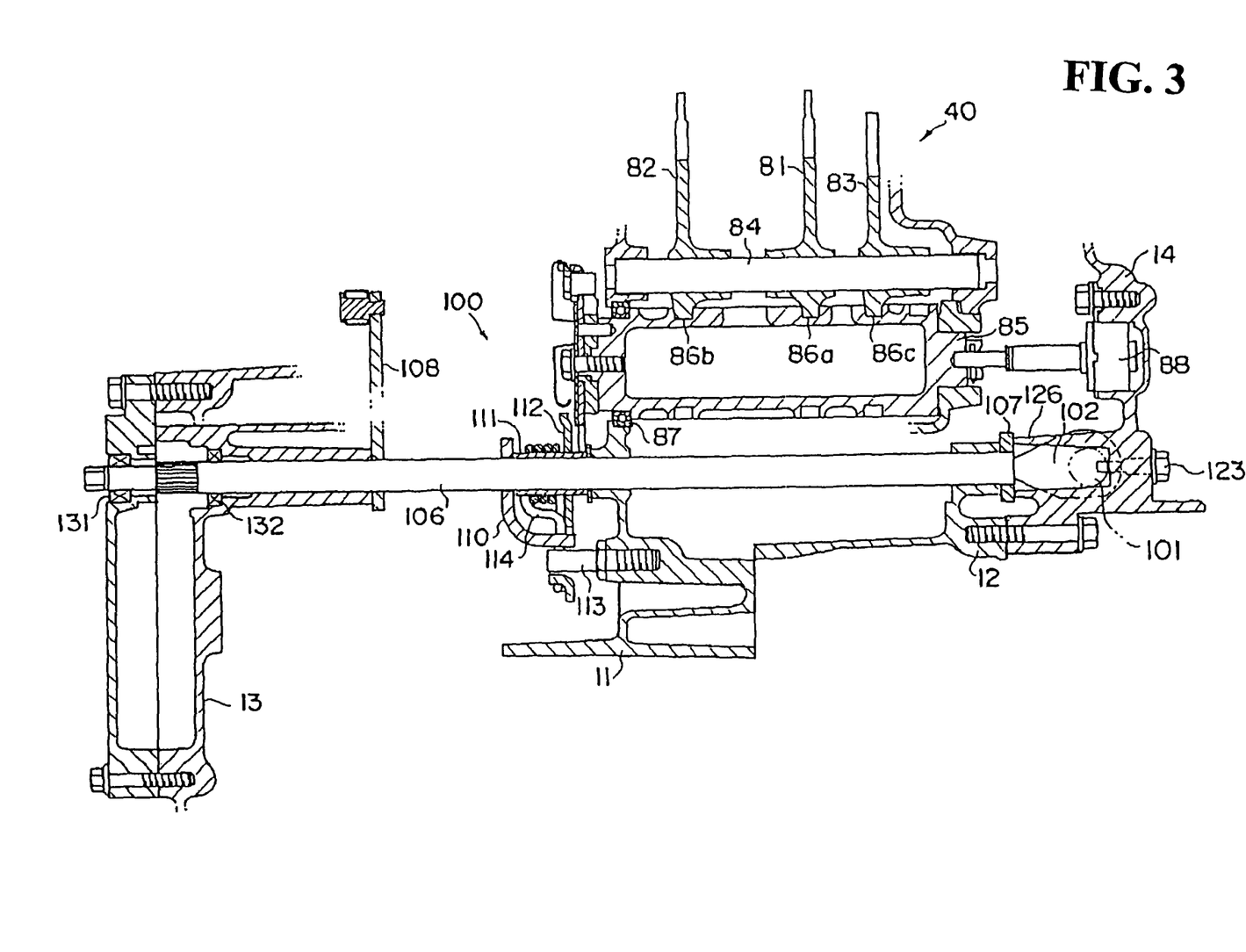
FIG. 3 is a cross-sectional view of a gear shifting mechanism.

A first shift fork 81 for holding the first/fourth gear change dog clutch member 72, a second shift fork 82 for holding the second/reverse gear change dog clutch member 73, and a third shift fork 83 for holding the third/fifth gear change dog clutch member 74 are supported by a shift fork shaft 84 disposed substantially in parallel with the counter shaft 42 as shown in FIG. 3 so as to be capable of sliding movement in the direction of the axis of the shift fork shaft 84. The first to the third shift forks 81 to 83 are respectively engaged with cam grooves 86a, 86b, 86c provided on the outer periphery of a shift drum 85, respectively.

The front end portion of the shift drum 85 is rotatably supported by the front case 11 via a ball bearing 87. The rear end portion of the shift drum 85 is directly supported by the rear case 12. A gear shifting mechanism 100 connected to the front end portion of the shift drum 85 rotates the shift drum 85. One of the respective gear trains 51 to 56 is alternatively established by the sliding movement of the first to third shift forks 81 to 83 in the direction of the axis of the shift fork shaft 84 by the rotation of the shift drum 85. A shift position detector 88 including a potentiometer detects the rotational position of the shift drum 85, i.e., the shift position. The shift position detector 88 is fixed to the rear cover 14 and is connected to the rear end of the shift drum 85.

Figure 4:
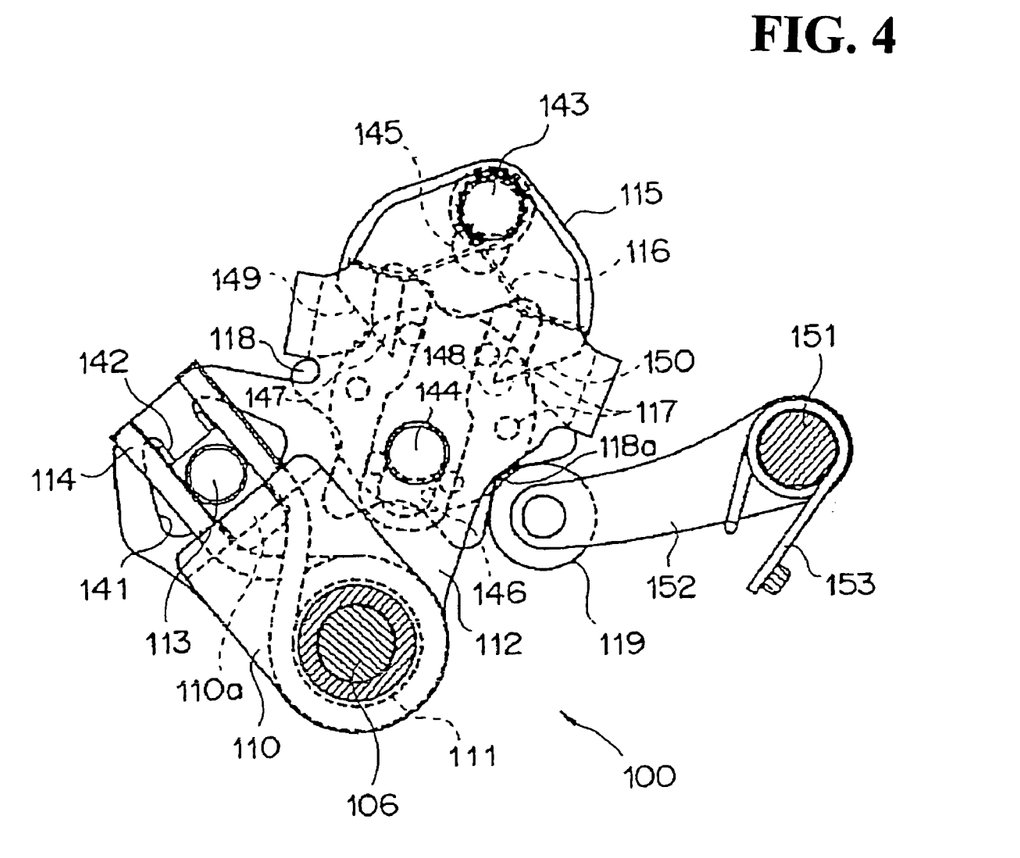
FIG. 4 is a cross-sectional view showing a state in which a ball unit is fitted to a boss member.

As shown in FIG. 3 and FIG. 4, the gear shifting mechanism 100 includes a shift spindle 101 extending in the lateral direction which forms a substantially right angle with respect to the shift drum 85. A sub shift spindle 106 is connected to the shift spindle 101 and extends substantially in parallel with the shift drum 85. An arm 110 is fixed to the sub shift spindle 106. A change arm 112 is secured to a collar 111, which is mounted to the outer periphery of the sub shift spindle 106 so as to be capable of relative rotation. A constraining pin 113 is secured to the front case 11 and is inserted through the change arm 112. A first torsion coil spring 114 demonstrates a spring force to make the change arm 112 restore to a neutral position. A shifter plate 115 is supported by the change arm 112 so as to be capable of relative movement of the change arm 112 within the range limited along the radial direction of the sub shift spindle 106. A second torsion coil spring 116 demonstrates a spring force for urging the shifter plate 115 inwardly in the above-described radial direction. A pin plate 118 is fixed to the front end of the shift drum 85 so as to oppose to the shifter plate 115 and is provided with six feed pins 117 implanted therein. A roller 119 is urged by the spring in the direction of being abutted to the outer periphery of the pin plate 118. A positioning pin 123 is provided for being locked in a groove 103 of the shift spindle 101 for restricting displacement of the shift spindle 101 in the direction other than the rotational direction.

Figure 5:
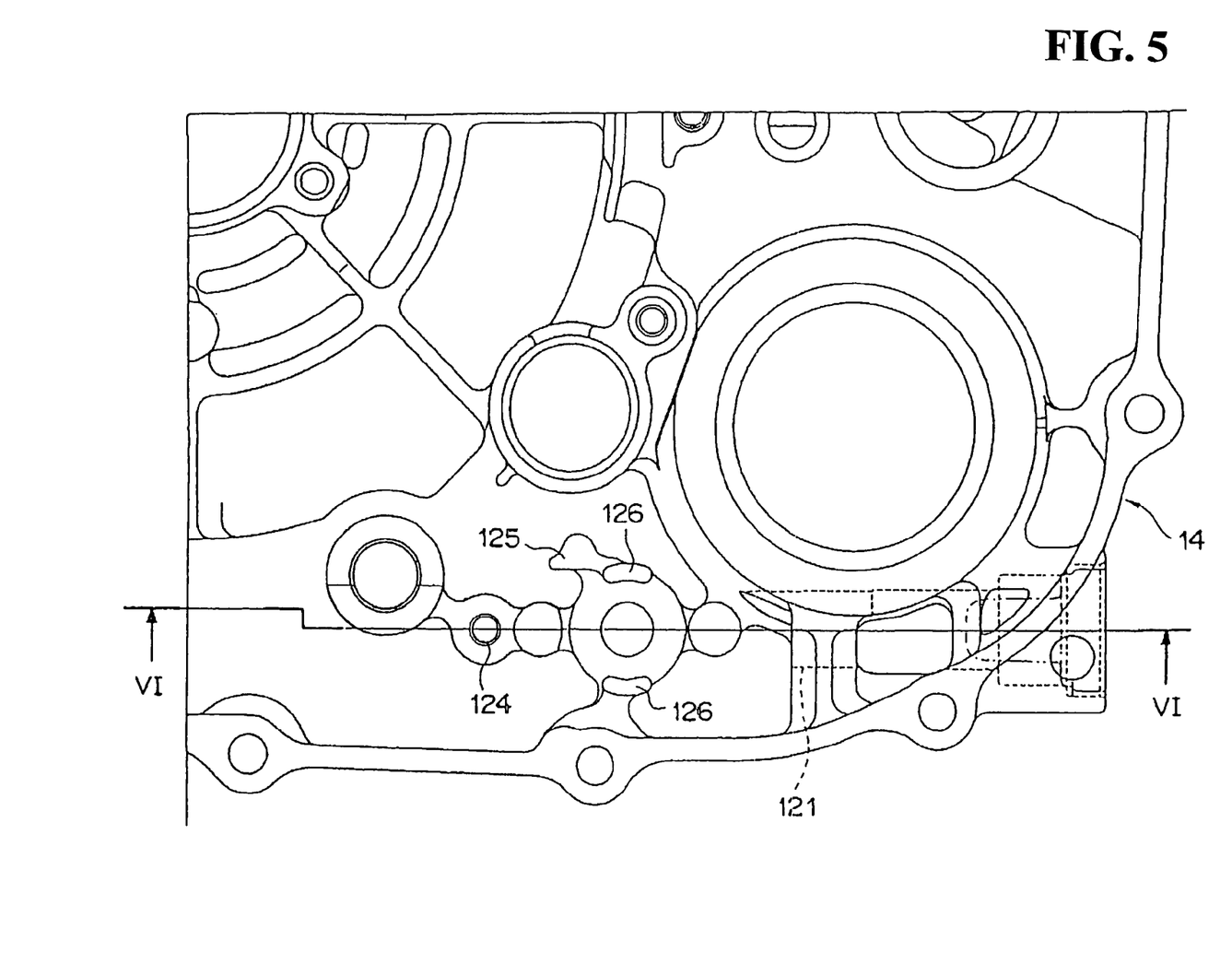
FIG. 5 is a front view showing a part of a rear cover.
Figure 6:
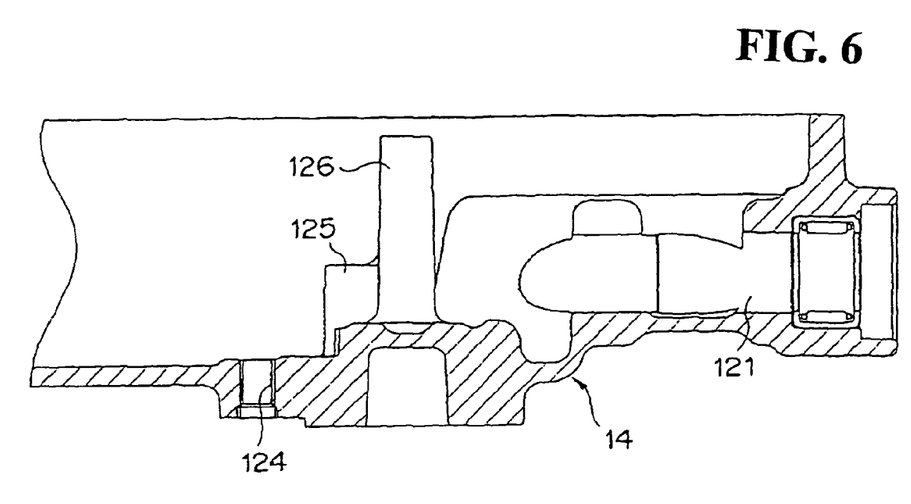
FIG. 6 is a cross-sectional view taken along an arrow VI-VI in FIG. 5.
Figure 7:
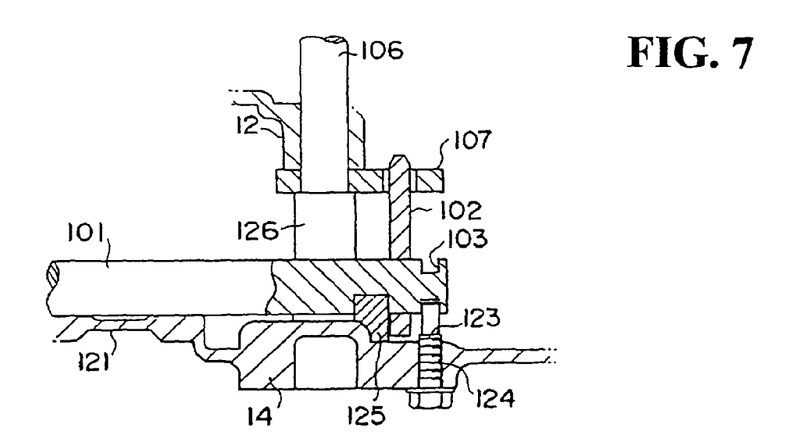
FIG. 7 is an enlarged cross-sectional view of a shift spindle and a sub shift spindle.

As shown in FIG. 5 to FIG. 7, the spindle supporting portion 121 formed inside a lower left portion of the rear cover 14 rotatably supports the shift spindle 101. A plate-shaped spindle plate 102 for transmitting the rotational drive force of the shift spindle 101 to the sub shift spindle 106 (shift drum 85) is secured to the shift spindle 101 near the right end by welding or the like. A change pedal (not shown) is attached to the left end of the shift spindle 101 so as to project outwardly of the power unit case 10.

As shown in FIG. 3 and FIG. 7, the sub shift spindle 106 is rotatably supported at the rear portion thereof by the rear case 12, passes rotatably through the front case 11, and is rotatably supported at the front portion thereof by the front cover 13 via bearings 131, 132. A plate-shaped sub spindle plate 107 which engages with the spindle plate 102 is secured to the rear end of the sub shift spindle 106 by welding or the like. The rotational drive force of the shift spindle 101 is transmitted to the sub shift spindle 106 via the spindle plate 102 and the sub spindle plate 107.

As shown in FIG. 4, the change arm 112 is provided with an opening 141 and a spring receiving portion 142 formed by bending the outer edge portion of the opening 141. Both end portions of the first torsion coil spring 114 supported by the collar 111 come into abutment with the both sides of the spring receiving portion 142 in a state in which the change arm 112 is at the neutral position. The distal end 110a of the arm 110 and the restricting pin 113 are inserted into the opening 141 between the both end portions of the first torsion coil spring 114.

In the state in which the change arm 112 is at the neutral position, when the shift spindle 101 and the sub shift spindle 106 are rotated in either the normal or reverse direction, the distal end portion 110a of the arm 110 comes into abutment with the side edge of one of the left and right of the opening 141 while bending the first torsion coil spring 114 so that the change arm 112 is rotated in either the normal or the reverse direction, whereby the change arm 112 rotates until the other one of the left and right side edge of the opening 141 comes into abutment with the restricting pin 113. In this state, when a motive power applied to the sub shift spindle 106 becomes "0", the arm 112, that is, the sub shift spindle 106 and the change arm 112, are restored to the neutral position by the spring force demonstrated by the first torsion coil spring 114.

Guide pins 143, 144 are crimped and fixed to the change arm 112 at two positions apart from each other along one radial direction of the sub shift spindle 106, respectively. On the other hand, elongated holes 145, 146 which the guide pins 143, 144 are inserted into and engaged with are formed on the shifter plate 115 so as to extend in the length direction along the above-described radial direction. Accordingly, the shifter plate 115 is supported by the surface of the shift drum 85 of the change arm 112 so as to be capable of sliding along one radial direction of the sub shift spindle 106.

Feed claws 147, 148 bent toward the shift drum 71 are provided at both sides of the shifter plate 115. Cams 149, 150 are formed on the outer sides of the feed claws 147, 148.

The second torsion coil spring 116 is supported by the guide pin 143 of one of the both guide pins 143, 144 which is located outside. The shifter plate 115 is urged inwardly of the change arm 112 along the radial direction of the sub shift spindle 106 by abutment of the both end portions of the second torsion coil spring 116 with the both feed claws 147, 148 of the shifter plate 115.

The outer periphery of the pin plate 118 is formed into a star shape having six recessed portions 118a arranged at circumferentially regular distance. The six feed pins 117 are implanted in the pin plate 118 so that the two feed pins 117, 117 are arranged between the both feed claws 147, 148 of the shifter plate 115.

One end of the roller 119 is supported by the other end of an arm 152, which is swingably supported by a front case 11 via a spindle 151. The arm 152 is urged into a direction to bring the roller 119 into abutment with the outer periphery of the pin plate 118 by a spring force of a third torsion coil spring 153 provided between the front case 11 and the arm 152.

In the gear shifting mechanism 100 as described above, one of the feed claws 147, 148 of the shifter plate 115 engages with one of the feed pins 117 of the pin plate 118 by the rotation of the change arm 112 in one of the normal and reverse directions in accordance with the rotation of the shift spindle 101 and the sub shift spindle 106 in one of the normal and reverse directions, so that the shift drum 85 is driven to rotate in either the normal or reverse direction. When the change arm 112 is restored to the neutral position by the spring force demonstrated by the first torsion coil spring 114, one of the feed pins 117 of the pin plate 118 comes into abutment with one of the cams 149, 150 formed on the both feed claws 147, 148 of the shifter plate 115, so that the shifter plate 115 is moved radially outwardly of the sub shift spindle 106 against the spring force of the second torsion coil spring 116, and one of the both feed claws 147, 148 climbs over one of the feed pins 117. In addition, the rotational position of the pin plate 118 is maintained by the roller 119 being engaged with one of the recessed portions 118a on the outer periphery of the pin plate 118.

As shown in FIG. 3, a clutch arm 108 is attached to the sub shift spindle 106, and the clutch arm 108 engages with a cam plate 34a of the clutch release mechanism 34. The clutch arm 108 swings according to the rotation in one of the normal and reverse directions of the shift spindle 101 and the sub shift spindle 106. The swinging movement of the clutch arm 108 rotates the cam plate 34a, so that the engaged state of the clutch device 35 is released at the time of gear shifting.

As shown in FIG. 7, the right end portion of the shift spindle 101 (that is, the rear portion of the power unit 1) is formed with a groove 103 into an annular shape along the peripheral portion of the shift spindle 101. The distal end portion of the positioning pin 123 mounted to the rear cover 14 is locked in the groove 103 to restrict displacement of the shift spindle 101 in the direction other than the rotational direction. The positional pin 123 having a male screw is mounted so as to be inserted into a through hole 124 having a female screw formed on the rear cover 14 from the opposite side (that is, the rear side of the rear cover 14) from the side on which the shift spindle 101 of the rear cover 14 is arranged. The distal end portion of the positioning pin 123 projecting from the inner side of the rear cover 14 is locked in the groove 103 of the shift spindle 101.

A rib 125 with which the spindle plate 102 can be abutted is formed on the inner side of the rear cover 14. The groove 103 of the shift spindle 101 is arranged on the extension of the through hole 124 in the state in which the spindle plate 102 comes into abutment with the rib 125. In addition, a projecting strip 126 is formed on the inner side of the rear cover 14 integrally with the rib 125. The projecting strip 126 extends inwardly (forwardly) of the rear cover 14 so as to project further than the rib 125 so that the distal end of the projecting strip 126 comes into abutment with the rear end surface of the sub spindle plate 107.

In this manner, the rib 125 with which the spindle plate 102 can come into abutment is formed on the inner side of the rear cover 14, and the groove 103 is arranged on the extension of the through hole 124 in the state in which the spindle plate 102 comes into abutment with the rib 125. Therefore, the distal end of the positioning pin 123 can easily be locked in the groove 103 of the shift spindle 101 without confirming the side of the rear cover 14 on which the shift spindle 101 is arranged (that is, the front side of the rear cover 14) at the time of assembling the shift spindle 101, whereby assembly of the shift spindle 101 can be improved.

The distal end of the projecting strip 126, which comes into abutment with the sub spindle plate 107, is formed on the inner side of the rear cover 14 integrally with the rib 125. Therefore, the strength of the projecting strip 126, which receives the thrust power of the sub shift spindle 106, can be increased with a simple configuration.

When assembling the transmitting device 40 to the power unit case 10, firstly, the main shaft 41 and the counter shaft 42 (and the intermediate shaft 75) are inserted into predetermined positions of the rear case 12, and then the respective gears are assembled to the inserted main shaft 41 and the counter shaft 42 to assemble the gear train 50. At this time, the respective shift forks 81 to 83 are inserted into the corresponding dog clutch members 72 to 74, and then the respective shift forks 81 to 83 are engaged with the cam grooves 86a, 86b, 86c of the shift drum 85 respectively while holding the respective shift forks 81 to 83 inserted into the dog clutch members 72 to 74 by hand. As is understood from FIG. 2, a gap between a crank web 24a and the rear case 12 is relatively large, and the third shift fork 83 enters into the gap when engaging the respective shift forks 81 to 83 with the cam grooves 86a, 86b, 86c, and hence the assembly may become difficult. Therefore, as shown in FIG. 1 and FIG. 2, the rear case 12 is formed with a holding rib 135 adjacently to the third shift fork 83, so that the third shift fork 83 is prevented from entering into the above-described gap whereby the assembly of the respective shift forks 81 to 83 is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission device comprising:
a gear train that can achieve a plurality of transmission speed ranges;
a shift fork for changing meshing of the gear train;
a shift drum for driving the shift fork;
a rotatable shift spindle for driving the shift drum, the shift spindle includes and unifies with a spindle plate for transmitting a rotational drive force of the shift spindle to the shift fork and a groove formed into an annular shape along a peripheral portion of the shift spindle;
a cover member for covering the gear train, the shift fork, the shift drum and the shift spindle, the shift spindle being rotatably supported by one side of the cover member;
a positioning pin, said positioning pin being mounted by being inserted into a through hole formed on and through the cover member from outside of the cover member so that a distal end portion of the positioning pin projects from said one side of the cover member, the distal end portion being locked with the groove in the rotatable shift spindle; and
a rib, said rib being formed inside the cover member;
a sub shift spindle extending substantially parallel to the longitudinal direction of the shift drum;
a sub spindle plate engaged with the spindle plate at a distal end of the spindle plate;
a projecting strip extending on the one side of the cover member, the projecting strip being in direct contact with the rib, a distal end of the projecting strip coming into abutment with the sub spindle plate,
wherein the spindle plate comes into abutment with the rib and is welded and secured to the shift spindle near a right end of the shift spindle, the spindle plate restrains the shift spindle from sliding in an axial direction of the shift spindle, and the groove is aligned with the through hole and the spindle plate is located between the rib and the positioning pin when the spindle plate comes into abutment with the rib, and
wherein the rib is spaced apart from the positioning pin and in contact with the cover member.

2. The transmission device according to claim 1, wherein the shift spindle is configured to extend in a direction that forms a substantially right angle with respect to a longitudinal direction of the shift drum, and the sub shift spindle is disposed to extend substantially parallel to the longitudinal direction of the shift drum on the one side of the cover member and is rotatable for driving the shift drum using a rotational drive force of the shift spindle.

3. The transmission device according to claim 2, wherein the rotational drive force of the shift spindle is transmitted to the sub shift spindle via the spindle plate and the sub spindle plate.

4. The transmission device according to claim 3, wherein the projecting strip is formed on the one side of the cover member integrally with the rib, and the projecting strip projects further than the rib so that the distal end of the projecting strip comes into abutment with the sub spindle plate.

5. The transmission device according to claim 2, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

6. The transmission device according to claim 5, wherein the change arm is provided with an opening and a spring receiving portion that is formed by bending an outer edge portion of the opening, and the spring receiving portion receives a torsion spring that biases the change arm to a neutral position.

7. The transmission device according to claim 3, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

8. The transmission device according to claim 7, wherein the change arm is provided with an opening and a spring receiving portion that is formed by bending an outer edge portion of the opening, and the spring receiving portion receives a torsion spring that biases the change arm to a neutral position.

9. The transmission device according to claim 4, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

10. The transmission device according to claim 9, wherein the change arm is provided with an opening and a spring receiving portion that is formed by bending an outer edge portion of the opening, and the spring receiving portion receives a torsion spring that biases the change arm to a neutral position.

11. A shift spindle assembly for a transmission device, the shift spindle assembly comprising:
a rotatable shift spindle, the shift spindle includes and unifies with a spindle plate for transmitting a rotational drive force of the shift spindle to the transmission device and a groove formed into an annular shape along a peripheral portion of the shift spindle;
a cover member for covering the transmission device and the shift spindle, the shift spindle being rotatably supported by one side of the cover member;
a positioning pin, said positioning pin being mounted by being inserted into a through hole formed on and through the cover member from outside of the cover member so that a distal end portion of the positioning pin projects from said one side of the cover member, the distal end portion being locked with the groove in the rotatable shift spindle; and
a rib, said rib being formed inside the cover member;
a sub shift spindle extending substantially parallel to the longitudinal direction of the shift drum;
a sub spindle plate engaged with the spindle plate at a distal end of the spindle plate;
a projecting strip extending on the one side of the cover member, the projecting strip being in direct contact with the rib, a distal end of the projecting strip coming into abutment with the sub spindle plate,
wherein the spindle plate comes into abutment with the rib and is welded and secured to the shift spindle near a right end of the shift spindle, the spindle plate restrains the shift spindle from sliding in an axial direction of the shift spindle, and the groove is aligned with the through hole and the spindle plate is located between the rib and the positioning pin when the spindle plate comes into abutment with the rib, and
wherein the rib is spaced apart from the positioning pin and in contact with the cover member.

12. The shift spindle assembly according to claim 11, wherein the shift spindle is configured to extend in a direction that forms a substantially right angle with respect to a longitudinal direction of a shift drum of the transmission device, and the sub shift spindle is disposed to extend substantially parallel to the longitudinal direction of the shift drum on the one side of the cover member and is rotatable for driving the shift drum using a rotational drive force of the shift spindle.

13. The shift spindle assembly according to claim 12, wherein the rotational drive force of the shift spindle is transmitted to the sub shift spindle via the spindle plate and the sub spindle plate.

14. The shift spindle assembly according to claim 13, wherein the projecting strip is formed on the one side of the cover member integrally with the rib, and the projecting strip projects further than the rib so that the distal end of the projecting strip comes into abutment with the sub spindle plate.

15. The shift spindle assembly according to claim 12, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

16. The shift spindle assembly according to claim 15, wherein the change arm is provided with an opening and a spring receiving portion that is formed by bending an outer edge portion of the opening, and the spring receiving portion receives a torsion spring that biases the change arm to a neutral position.

17. The shift spindle assembly according to claim 13, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

18. The shift spindle assembly according to claim 17, wherein the change arm is provided with an opening and a spring receiving portion that is formed by bending an outer edge portion of the opening, and the spring receiving portion receives a torsion spring that biases the change arm to a neutral position.

19. The shift spindle assembly according to claim 14, wherein an arm is fixed to the sub shift spindle, a change arm is secured to a collar that is rotatably mounted on an outer periphery of the sub shift spindle, and the rotational driving force of the sub shift spindle is transmitted to the shift drum via the arm and the change arm.

20. The shift spindle assembly according to claim 19, wherein the change arm is provided with an opening and a spring receiving portion that is formed by bending an outer edge portion of the opening, and the spring receiving portion receives a torsion spring that biases the change arm to a neutral position.

21. The transmission device according to claim 1, wherein an opposite distal end portion of the positioning pin is located outside of the cover member.

22. The shift spindle assembly according to claim 11, wherein an opposite distal end portion of the positioning pin is located outside of the cover member.

* * * * *